(12) United States Patent
Shenfield et al.

(10) Patent No.: US 7,805,735 B2
(45) Date of Patent: Sep. 28, 2010

(54) SYSTEM AND METHOD OF REPRESENTING DATA ENTITIES OF STANDARD DEVICE APPLICATIONS AS BUILT-IN COMPONENTS

(75) Inventors: Michael Shenfield, Richmond Hill (CA); Richard Qing, Ontario (CA); Ken Wallis, Oakville (CA); Viera Bibr, Kilbride (CA); Cameron Bateman, San Francisco, CA (US); Kamen Vitanov, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1240 days.

(21) Appl. No.: 11/350,098

(22) Filed: Feb. 9, 2006

(65) Prior Publication Data

US 2006/0251047 A1 Nov. 9, 2006

Related U.S. Application Data

(60) Provisional application No. 60/672,077, filed on Apr. 18, 2005.

(51) Int. Cl.
*G06F 3/00* (2006.01)
*G06F 15/16* (2006.01)
*G06F 9/44* (2006.01)

(52) U.S. Cl. .................. 719/328; 709/202; 717/100
(58) Field of Classification Search ................ 719/328; 709/202; 717/100
See application file for complete search history.

(56) References Cited

U.S. PATENT DOCUMENTS

| 6,735,773 | B1 | 5/2004 | Trinh et al. | |
| 7,013,335 | B2 * | 3/2006 | Barnhouse et al. | 709/223 |
| 7,406,520 | B2 * | 7/2008 | Schneider et al. | 709/225 |
| 7,409,591 | B2 * | 8/2008 | Sakai et al. | 714/25 |
| 2004/0117435 | A1 * | 6/2004 | Rossmanith et al. | 709/202 |

FOREIGN PATENT DOCUMENTS

WO WO 98/30962 7/1998

(Continued)

OTHER PUBLICATIONS

John D. Poole, Model-Driven Architecture: Vision, Standards And Emerging Technologies, Apr. 2001.*

(Continued)

*Primary Examiner*—Lechi Truong
(74) *Attorney, Agent, or Firm*—Mark Sprigings; Gowling Lafleur Henderson LLP

(57) ABSTRACT

A system and method for developing a standard data component for coupling with a plurality of components of a component-based application to access a stored data entity of a non-component-based native application, the applications for executing in a runtime environment of a device. The system and method comprises an application module configured for storing a model of the component-based application including features of data and message component definitions expressed in a structured definition language. Also included is a native module configured for storing properties of the data entity of the native application and a standard module for generating the standard data component definition based on the features of the component-based application and the properties of the data entity of the native application. The standard data component definition is expressed in the structured definition language.

17 Claims, 9 Drawing Sheets

FOREIGN PATENT DOCUMENTS

| WO | WO 02/057875 | 7/2002 |
| WO | WO 2004/059939 | 7/2004 |
| WO | WO 2004/079973 | 9/2004 |

OTHER PUBLICATIONS

Rosenblum, "The Reincarnation of Virtual Machines", Aug. 31, 2004, Virtual Machines, vol. 2, No. 5.

PCT International Search Report and Written Opinion for PCT International Application No. PCT/CA2006/000186, May 30, 2006, 12 pages, International Searching Authority.

Mendel Rosenblum, "The Reincarnation of Virtual Machines", Aug. 31, 2004, Virtual Machines, vol. 2, No. 5.

International Preliminary Search Report on Patentability for International Application No. PCT/CA2006/000186. Dated Nov. 1, 2007.

International Search Report for International Application No. PCT/CA2006/000186. Dated May 2, 2008.

Extended European Search Report. Dated May 2, 2008.

* cited by examiner

SYSTEM AND METHOD OF REPRESENTING DATA ENTITIES OF STANDARD DEVICE APPLICATIONS AS BUILT-IN COMPONENTS

This application claims the benefit of U.S. provisional 60/672,077, filed Apr. 18, 2005, the entire disclosure of which is herein incorporated by reference.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

This application relates generally to communications between a client application and a data source coupled over a network.

BACKGROUND

There are continually increasing numbers of terminals and mobile devices in use today, such as smart phones, PDAs with wireless communication capabilities, personal computers, self-service kiosks and two-way pagers/communication devices. Software applications which run on these devices help to increase their utility. For example, a smart phone may include an application which retrieves the weather for a range of cities, or a PDA which may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task.

Devices from different manufacturers expose native application data entities (NADEs) by providing their native application programming interfaces (APIs), which are usually not compliant with one other. Following the traditional way of developing a native application, a third party application vendor tailors or re-develops native applications on a per-device manner in order to use specific vendors' proprietary function calls (native APIs) to access NADEs resident in onboard memory of the device. Furthermore, for a specific device, the same piece of code for each of the respective native APIs has to be rewritten or otherwise tailored for each of its device specific native applications in order to access the device's respective NADEs. This revision (i.e. versioning) of native APIs could be avoided by somehow sharing the code of the native APIs among these native applications.

Systems and methods disclosed herein provide a development tool to obviate or mitigate at least some of the above-presented disadvantages.

BRIEF DESCRIPTION OF THE DRAWINGS

These and other features will become more apparent in the following detailed description in which reference is made to the appended drawings wherein.

DESCRIPTION

Figure 1:
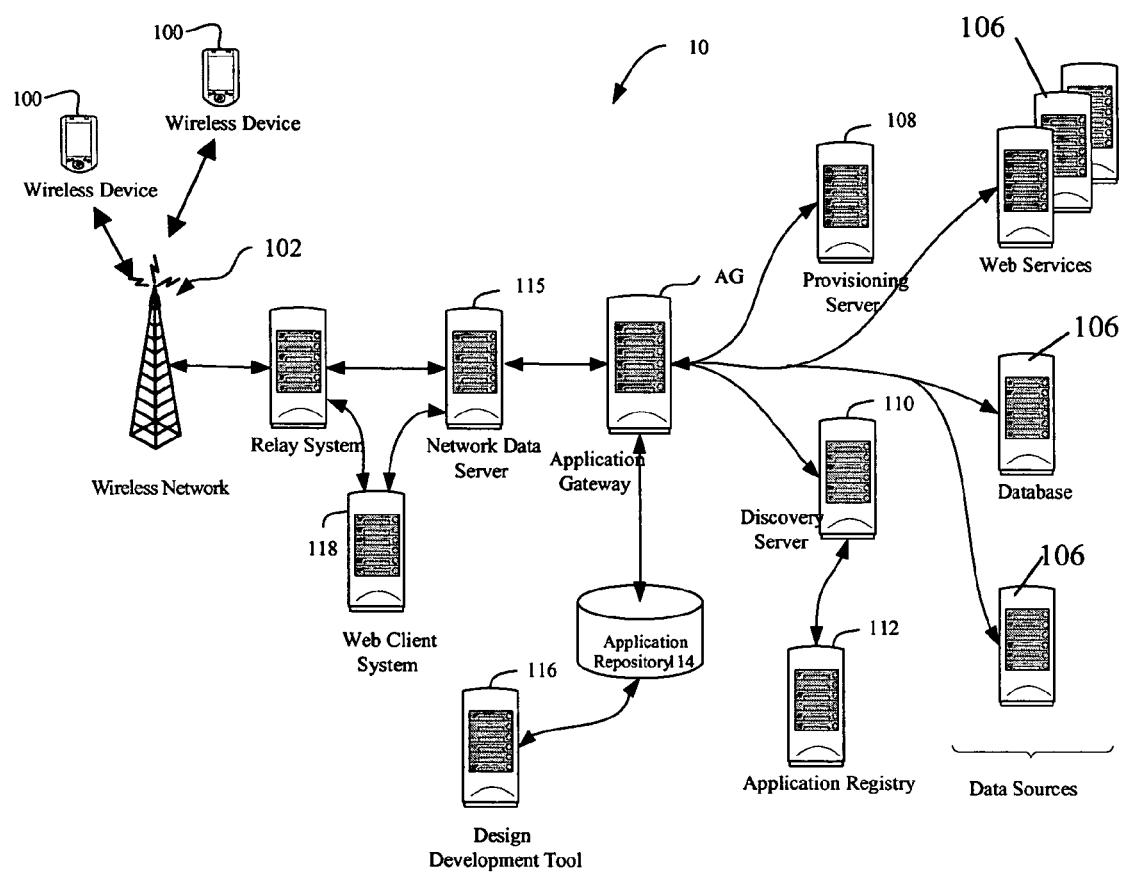
FIG. 1 is a block diagram of a communication network system.

Devices from different manufacturers expose native application data entities (NADEs) by providing their native application programming interfaces (APIs), which are usually not compliant with one other. Furthermore, for a specific device, the same piece of code for each of the respective native APIs has to be rewritten or otherwise tailored for each of its device specific native applications in order to access the device's respective NADEs. Contrary to present implementations there is provided a system and method for developing a standard data component for coupling with a plurality of components of a component-based application to access a stored data entity of a non-component-based native application, the applications for executing in a runtime environment of a device. The system and method comprises an application module configured for storing a model of the component-based application including features of data and message component definitions expressed in a structured definition language. Also included is a native module configured for storing properties of the data entity of the native application and a standard module for generating the standard data component definition based on the features of the component-based application and the properties of the data entity of the native application. The standard data component definition is expressed in the structured definition language.

Accordingly there is provided a system for developing a standard data component for coupling with a plurality of components of a component-based application to access a stored data entity of a non-component-based native application, the applications having the plurality of components including metadata descriptors expressed in a structured definition language for defining execution of the application in a runtime environment of a device, the system comprising: an application module configured for storing a model of the component-based application including features of data and message metadata descriptors expressed in the structured definition language; a native module configured for storing properties of the data entity of the native application; and a standard module for generating the standard data component definition as additional metadata descriptors based on the features of the component-based application and the properties of the data entity of the native application, the additional metadata descriptors of the standard data component definition expressed in the structured definition language.

Also provided is a method for developing a standard data component for coupling with a plurality of components of a component-based application to access a stored data entity of a non-component-based native application, the applications having the plurality of components including metadata descriptors expressed in a structured definition language for defining execution of the application in a runtime environment of a device, the method comprising the steps of: accessing a model of the component-based application including features of data and message component metadata descriptors expressed in the structured definition language; accessing properties of the data entity of the native application; and generating the standard data component definition as additional metadata descriptors based on the features of the component-based application and the properties of the data entity of the native application, the additional metadata descriptors of the standard data component definition expressed in the structured definition language.

Also provided is a computer program product for developing a standard data component for coupling with a plurality of components of a component-based application to access a stored data entity of a non-component-based native application, the applications having the plurality of components including metadata descriptors expressed in a structured definition language for defining execution of the application in a runtime environment of a device, the computer program product comprising: a computer readable medium; an application module stored on the computer readable medium and configured for storing a model of the component-based application including features of data and message metadata descriptors expressed in the structured definition language; a native module stored on the computer readable medium and configured for storing properties of the data entity of the native application; and a standard module stored on the computer readable medium for generating the standard data component definition as additional metadata descriptors based on the features of the component-based application and the properties of the data entity of the native application, the additional metadata descriptors of the standard data component definition expressed in the structured definition language.

Network System 10

Referring to FIG. 1, a network system 10 comprises mobile communication devices 100 for interacting with one or more backend data sources 106 (e.g. a schema-based service such as web service or database that provides enterprise services used by an application 105) via a wireless network 102 coupled to an application gateway AG. The devices 100 are devices such as but not limited to mobile telephones, PDAs, two-way pagers, dual-mode communication devices. It is recognised that the application gateway AG and data sources 106 can be linked via extranets (e.g. the Internet) and/or intranets as is known in the art. The application gateway AG handles request/response messages initiated by the application 105 as well as subscription notifications pushed to the device 100 from the data sources 106. The Application Gateway AG functions as a Data Mapping Server for mediating messaging between a client runtime RE on the device 100 (executing the application(s) 105) and a backend server of the data sources 106. The gateway AG can provide for asynchronous messaging for the applications 105 and can integrate and communicate with legacy back-end data sources 106. The devices 100 transmit and receive the wireless applications 105, as further described below, when in communication with the data sources 106, as well as transmit/receive messaging associated with operation of the applications 105. The devices 100 operate as web clients of the data sources 106 through execution of the applications 105 when provisioned on respective runtime environments RE of the devices 100.

For satisfying the appropriate messaging associated with the applications 105, the application gateway AG communicates with the data sources 106 through various protocols (such as but not limited to HTTP, SQL, and component API) for exposing relevant business logic (methods) to the applications 105 once provisioned on the devices 100. The applications 105 can use the business logic of the data sources 106 similarly to calling a method on an object (or a function). It is recognized that the applications 105 can be downloaded/uploaded in relation to data sources 106 via the network 102 and application gateway AG directly to the devices 100. For example, the application gateway AG is coupled to a provisioning server 108 and a discovery server 110 for providing a mechanism for optimized over-the-air provisioning of the applications 105, including capabilities for application 105 discovery from the device 100 as listed in a Universal Description, Discovery and Integration (UDDI), for example, registry 112. The Registry 112 is a directory service where businesses can register and search for Web services, and can be part of the Discovery Service implemented by the server 110. The registry 112 is used for publishing the applications 105. The application 105 information in the registry 112 can contain such as but not limited to a Deployment Descriptor DD (contains information such as application 105 name, version, and description) as well as the location of this application 105 in an application repository 114. The registry can provide a directory for storing information about web services (as provided by the data sources 106) including a directory of web service interfaces described by WSDL, for example. Further, UDDI as a registry 112 is based on Internet standards such as but not limited to XML, HTTP, and DNS protocols.

Referring again to FIG. 1, for initialization of the runtime environment RE, the RE can receive the gateway AG URL and the gateway AG public key in a network data server 115 (e.g. Mobile Data Service) service book. The runtime environment RE uses this information to connect to the gateway AG for initial handshaking. Device 100 provisioning is implemented by a web client system 118, depending on the domain, which pushes the network data server 115 service book to the device 100. It is recognised there could be more than one gateway AG in the network 10, as desired. Once initialized, access to the applications 105 by the devices 100, as downloaded/uploaded, can be communicated via the gateway AG directly from the application repository 114, and/or in association with data source 106 direct access (not shown) to the repository 114.

Communication Device 100

Figure 3:
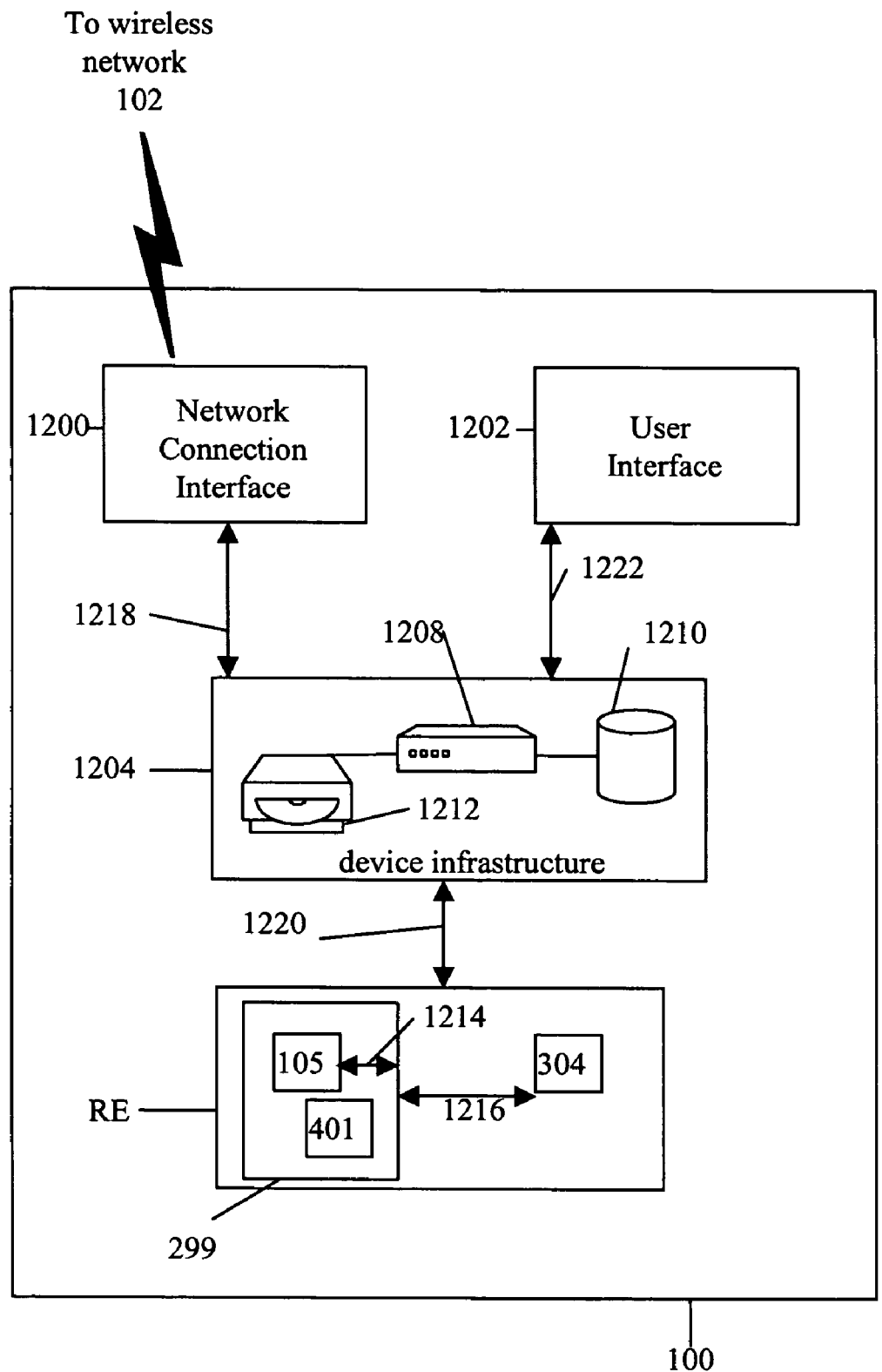
FIG. 3 is a block diagram of a device of FIG. 1.

Referring to FIG. 3, the devices 100 are devices such as but not limited to mobile telephones, PDAs, two-way pagers or dual-mode communication devices. The devices 100 include a network connection interface 1200, such as a wireless transceiver or a wired network interface card or a modem, coupled via connection 1218 to a device infrastructure 1204. The connection interface 1200 is connectable during operation of the devices 100 to the network, such as to the wireless network 102 by wireless links (e.g., RF, IR, etc.), which enables the devices 100 to communicate with each other and with external systems (such as the back end data sources 106) via the network 102 and to coordinate the requests/response messages between the client application programs 105 and the data sources 106 (see FIG. 1). The network 102 supports the transmission of data in the requests/response messages between devices 100 and external systems, which are connected to the network 102. A wireless data transmission protocol can be used by the wireless network 102, such as but not limited to DataTAC, GPRS or CDMA.

Referring again to FIG. 3, the devices 100 also have a user interface 1202, coupled to the device infrastructure 1204 by connection 1222, to interact with a user (not shown). The user interface 1202 includes one or more user input devices such as but not limited to a QWERTY keyboard, a keypad, a track-wheel, a stylus, a mouse, a microphone and the user output device such as an LCD screen display and/or a speaker. If the screen is touch sensitive, then the display can also be used as the user input device as controlled by the device infrastructure 1204. The user interface 1202 is employed by the user of the device 100 to coordinate the requests/response message messages over the system 10 (see FIG. 1) as employed by client applications 105 of a runtime environment RE, further described below.

Referring again to FIG. 3, operation of the device 100 is enabled by the device infrastructure 1204. The device infrastructure 1204 includes the computer processor 1208 and the associated memory module 1210. The computer processor 1208 manipulates the operation of the network interface 1200, the user interface 1202 and the runtime environment RE of the communication device 100 by executing related instructions, which are provided by an operating system and client applications 105 located in the memory module 1210. Further, it is recognized that the device infrastructure 1204 can include a computer readable storage medium 1212 coupled to the processor 1208 for providing instructions to the processor and/or to load/update client applications 105 in the memory module 1210. The computer readable medium 1212 can include hardware and/or software such as, by way of example only, magnetic disks, magnetic tape, optically readable medium such as CD/DVD ROMS, and memory cards. In each case, the computer readable medium 1212 may take the form of a small disk, floppy diskette, cassette, hard disk drive, solid state memory card, or RAM provided in the memory module 1210. It should be noted that the above listed example computer readable mediums 1212 can be used either alone or in combination.

Runtime Environment RE of Device 100

Referring again to FIG. 3, the Runtime Environment RE of the device 100 is coupled to the device infrastructure 1204 by the connection 1220, and is preferably capable of generating, hosting and executing the client applications 105 (which are in the form of component applications—see below) from meta-data definitions. Therefore, Runtime Environment RE provides the native client runtime environment for the client applications 105 and is an interface to the device 100 functionality of the processor 1208 and associated operating system of the device infrastructure 1204. The Runtime Environment RE provides an application container 299, for example, for execution of the applications 105. The application container 299 can be referred to as a smart host container for the client application 105, and can be responsible for analyzing message meta-data (of the messages) and for updating the representation of the meta-data of the data components 400 and standard data components 401 instantiated in the memory module 1210.

Further, specific functions of the client runtime environment RE can include such as but not limited to support for language, coordinating memory allocation, networking, management of data during I/O operations, coordinating graphics on an output device of the devices 100 and providing access to core object oriented classes and supporting files/libraries.

Figure 4:
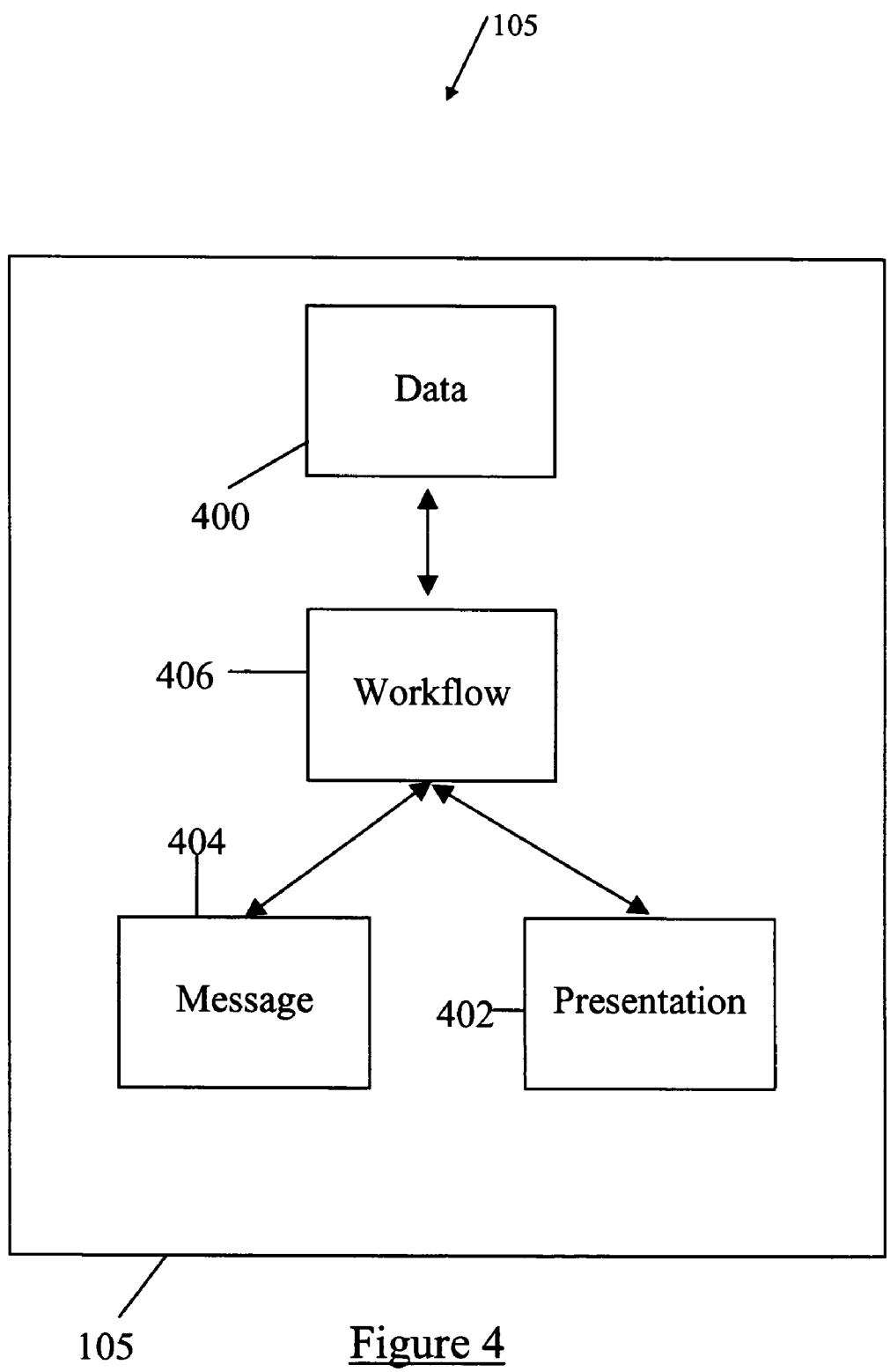
FIG. 4 shows an example configuration of the application of FIG. 1.
Figure 5:
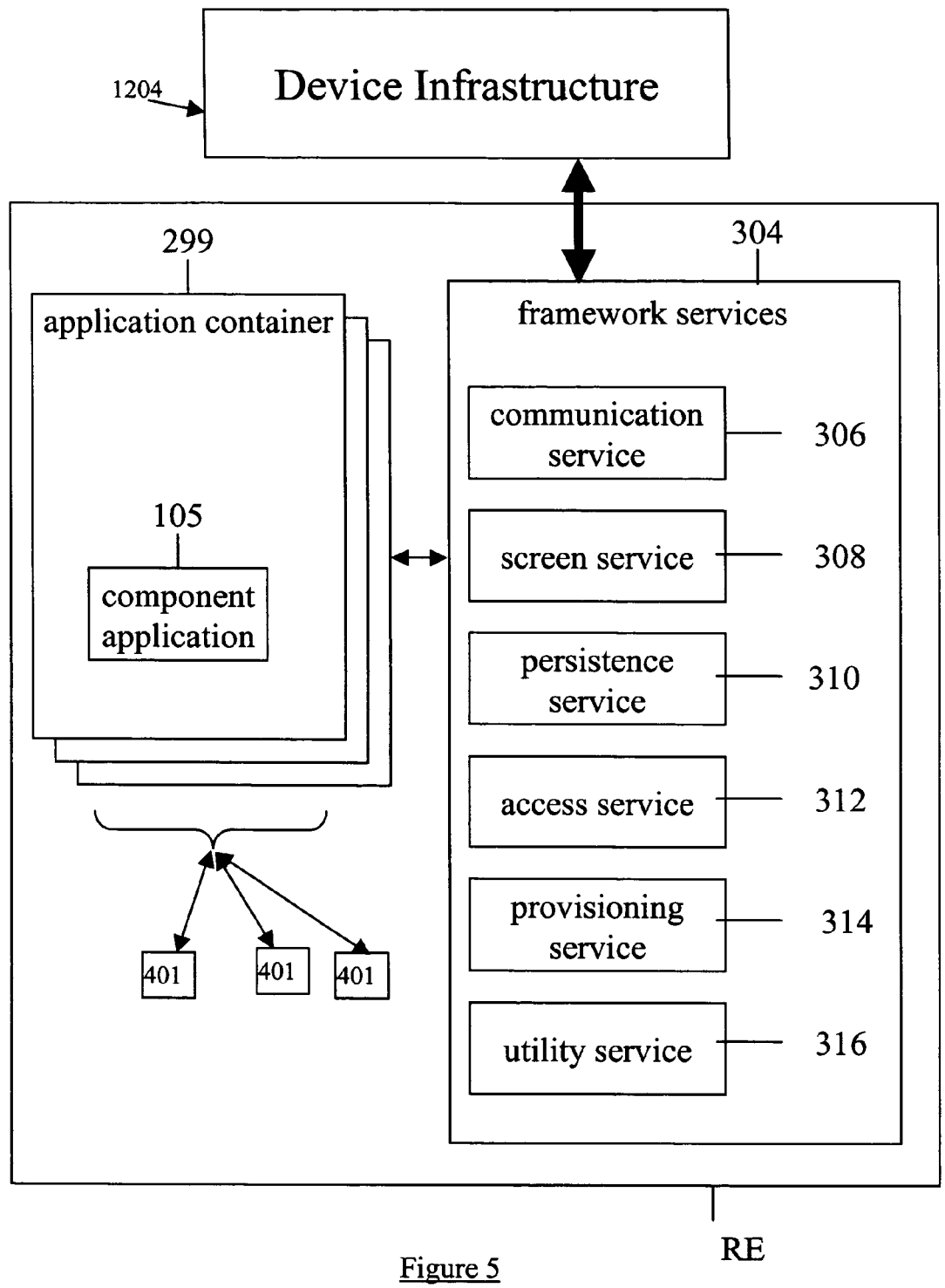
FIG. 5 is example embodiment of a runtime environment of FIG. 1.

The terminal runtime environment of the devices 100 preferably supports the following basic functions for the resident executable versions of the client applications 105 (see FIG. 3), such as but not limited to:

provide a communications capability to send messages to the Web Services 106 or messages to any other generic schema defined services connected via the network 102 to the devices 100;

provide data input capabilities by the user on the input device 1202 of the devices 100 to supply data parts for Web Services' outgoing messages (messages to the service);

provide data presentation or output capabilities for Web Services' response messages (incoming messages) or uncorrelated notifications of the Web Service 106 on the output device 1202;

provide data storage services to maintain local client data in the memory module 1210 (see FIG. 2) of the device 100, for example for the data components 400 and standard data components 401 (see FIG. 5); and provide an execution environment for a scripting language for coordinating operation of the application components 400, 402, 404, 406 (see FIG. 4) of the client applications 105 including the standard data components 401 (see FIG. 5).

The component applications 105 comprise software applications which are executed by the Runtime Environment RE. The Runtime Environment RE creates the application container 299 for each component 400, 402, 404, 406 (see FIG. 4) of the application 105, each time that the component application 105 is executed. The application container 299 loads the components 400, 402, 404, 406 of the application 105 linked with the standard data components 401 and can create native code which is executed by the processor 1208 in the device infrastructure 1204. The application container can provision the component application 105 as per the template-based native execution and metadata-based execution models as described.

Referring to FIG. 3, the client runtime RE loads the metadata contained in the component 400, 401, 402, 404, 406 definitions and builds the executable version of the application 105 on the device 100, via the application container 299. For example, there are the two operational models for client runtime: template-based native execution and metadata-based execution. With the template-based native execution model the runtime hosts data, message, and screen templates pre-built on the device 100 using the native code. When the application 105 definition is loaded, the client environment provided by the client runtime RE fills the templates with metadata-defined parameters from the components 400, 401, 402, 404 and builds the executable client application 105 in the native format. The workflow script (for example ECMAScript) of the workflow component 406 could be either converted to native code or executed using an appropriate script interpreter (e.g., ECMAScript Interpreter) to a native code redirector, where the redirector interprets calls to the scripting language into operations on native components through a native runtime engine. With the metadata-based execution, the runtime environment of the client runtime RE either keeps component 400, 401, 402, 404, 406 definitions in XML (for example), which are parsed during execution time or uses native representation of XML (for example) nodes. During execution, the native runtime engine operates on definitions of the components 400, 401, 402, 404, 406 rather than on native component entities. It is recognized that the template-based approach can be more performance efficient over the metadata-based execution, but can require a more sophisticated execution environment and more memory resources.

Referring to FIG. 5, the Runtime Environment RE can also provide framework services 304 (a standard set of generic services) to the client application 105, in the event certain services are not included as part of the components 400, 401, 402, 404, 406 (see FIG. 4) or received as separate components (not shown) as part of the component application 105. The application 105 has communications 1214 with the application container 299, which coordinates communications 1216 with the framework services 304, as needed. The framework services 304 of the Runtime Environment RE can coordinate communications via the connection 1220 with the device infrastructure 1204, and can include such as but not limited to a communication service 306, a presentation service 308, a persistence service 310, an access service 312, a provisioning service 314 and a utility service 316. The communication service 306 manages connectivity between the component applications 105 and the external system 10, such as the messages and associated data sent/received in respect to the web service (by the communication service 306) on behalf of the component applications 105. The presentation service 308 manages the representation of the component application 105 as they are output on the output device of the user interface 1202 (see FIG. 3). The persistence service 310 allows the component application 105 to store data in the memory module 1210 (see FIG. 3) of the device infrastructure 1204. The access service 312 provides the component application 105 access to other software applications which are present on the communication device 100 and are not component based applications 105, rather native based applications. The provisioning service 314 manages the provisioning of software applications on the communication device 100. Application provisioning can include requesting and receiving new and updated component applications 105, configuring component applications 105 for access to services which are accessible via the network 102, modifying the configuration of component applications 105 and services, and removing component applications 105 and services. The utility service 316 is used to accomplish a variety of common tasks, such as performing data manipulation in the conversion of strings to different formats.

It is recognized that the framework services 304 of the communication device 100 can provide functionality to the component applications 105, which can include the services described above. As a result, the component applications 105 can have access to the functionality of the communication device 100 without having to implement it. The runtime environment RE of the device 100 has only preferably one copy of the code which implements these services present in the framework services 304, regardless of the number of component applications 105 which are present, thereby minimizing code duplication of the framework services 304. Further, unlike ordinary applications where all service requests or service API calls are programmed by developers in the native code, the component definitions 400, 401, 402, 404 and workflow 406 describe service requests using a structured definition language such as XML and the set of instructions such as ECMAScript. The structured definition language provides a non-procedural definition of the application's user interface 1202, persistent storage and communications with the Web Service, while the instructions provide the procedural component linkage. The Client runtime environment interprets these definitions 400, 401, 402, 404 into the native calls to supported services.

Application Developer Tool 116

Referring to FIG. 1, the applications 105 can be stored in the repository 114 as a series of packages that can be created by a developer tool 116, which is employed by developers of the applications 105. The developer tool 116 can be a RAD tool used to develop the Wireless Application 105 packages, as well as develop built in or standard data components 401 (see FIG. 7) for accessing native application data entities (NADEs) 700 such as but not limited to contacts, email, tasks, calendar, appointments of native device applications (NDAs) 704 (e.g. Microsoft Outlook features) and other non-component based applications that may be desirable for direct access by the component applications 105, as further described below. It is recognised that the non-component based applications, including NDAs 704, contain a plurality of data that may overlap one another. For example, contacts and email applications can both contain a separate copy of an individuals name and email address, which preferably could be one copy sharable by the component and non-component based applications through the standard data components 401.

The developer tool 116 can provide support for a drag-and-drop graphical approach for the visual design of the application 105, including the mapping model. For example, in a component based XML-Script application model, the application 105 packages can be represented as metadata (XML) that can be generated automatically by the developer tool 116 through an automatic code generation process. The developer tool 116 can provide for the automatic generated code to include or be otherwise augmented by an industry standard scripting language (e.g. JavaScript) or other scripting/programming languages known in the art. The availability of the application 105 packages of the repository 114 are published via the discovery service of the server 110 in the registry 112. It is recognized that there can be more than one repository 114 and associated registries 112 as utilized by the particular network 10 configuration of the application gateway AG and associated data sources 106.

Figure 2:
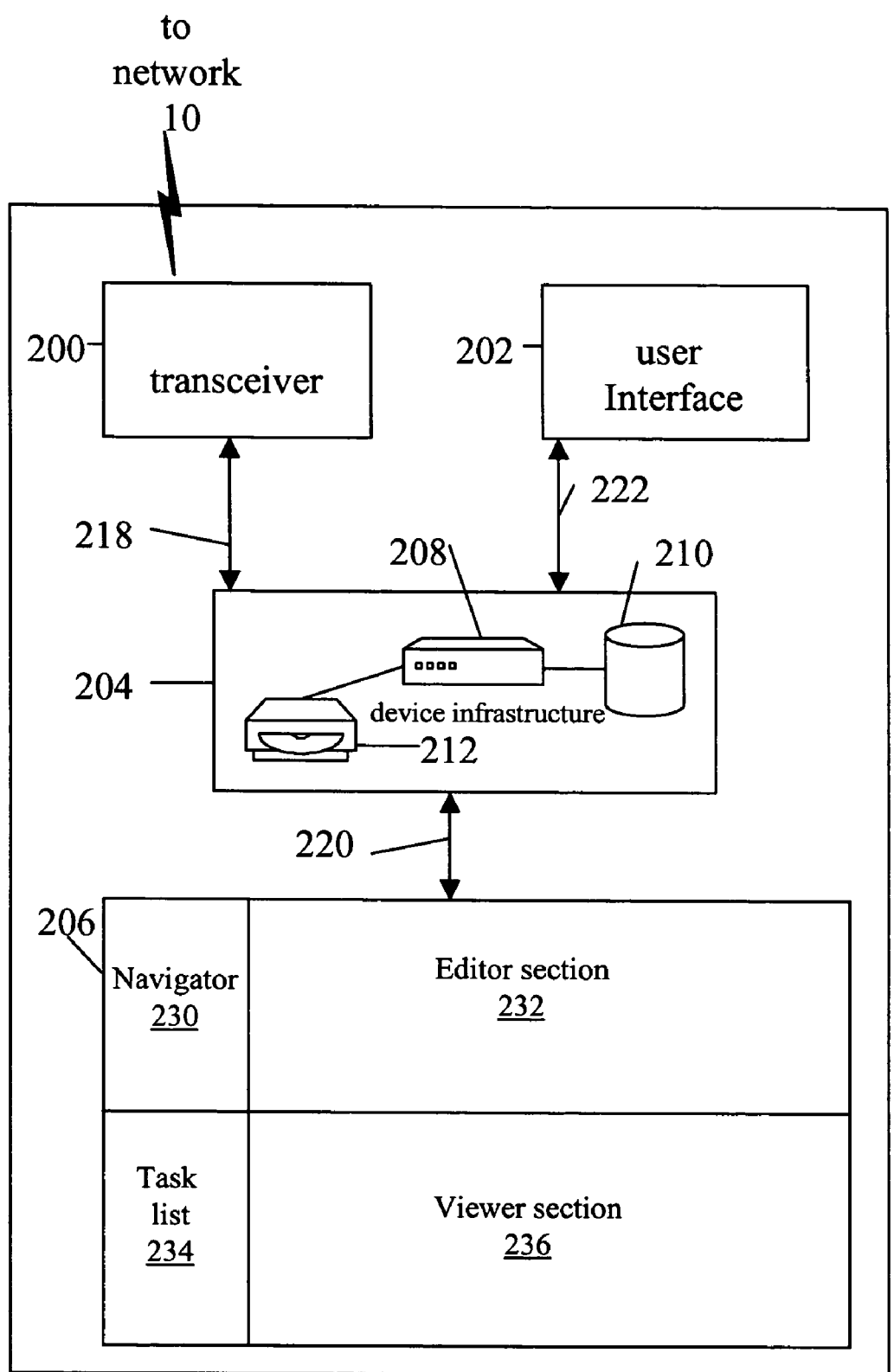
FIG. 2 is a block diagram of a tool for developing and generating the applications of FIG. 1 including standard data components.

Referring to FIG. 2, the developer tool 116 is operated on a computer 201 that can be connected to the network 10 via a network connection interface such as a transceiver 200 coupled via connection 218 to a device infrastructure 204. The transceiver 200 can be used to upload completed application programs 105 to the repository 114 (see FIG. 1), as well as access the registry 112 and selected data sources 106. Referring again to FIG. 2, the developer tool 116 also has a user interface 202, coupled to the device infrastructure 204 by connection 222, to interact with a user (not shown). The user interface 202 includes one or more user input devices such as but not limited to a keyboard, a keypad, a trackwheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface 202 is employed by the user of the developer tool 116 to coordinate the design of applications 105 and/or the standard data components 401 (see FIG. 5) using a series of editors 600 and viewers 602 (see FIG. 6) and using a plurality of wizards 604 to assist/drive in the workflow of the development process.

Referring again to FIG. 2, operation of the tool computer 201 is enabled by the device infrastructure 204. The device infrastructure 204 includes a computer processor 208 and the associated memory module 210. The computer processor 208 manipulates the operation of the network interface 200, the user interface 202 and the display 206 of the developer tool 116 by executing related instructions, which are provided by an operating system and application 105 design editors 600, wizards 604, dialogs 605 and viewers 602 resident in the memory module 210. Further, it is recognized that the device infrastructure 204 can include a computer readable storage medium 212 coupled to the processor 208 for providing instructions to the processor 208 and/or to load/design the applications 105 also resident (for example) in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210.

It should be noted that the above listed example computer readable mediums 212 can be used either alone or in combination.

Referring again to FIGS. 2 and 8, the developer tool 116 is operated on the computer 201 as a development environment for developing the applications 105 and/or the standard data components 401. The development methodology of the developer tool 116 can be based on a visual "drag-and-drop" system of building the application visual, data, messaging behaviour, and runtime navigation model. The developer tool 116 can be structured as a set of plug-ins to a generic integrated design environment (IDE) framework, such as but not limited to the Eclipse framework, or the developer tool 116 can be configured as a complete design framework without using plug-in architecture. For exemplary purposes only, the developer tool 116 will now be described as a plug-in design environment using the Eclipse framework.

Figure 6:
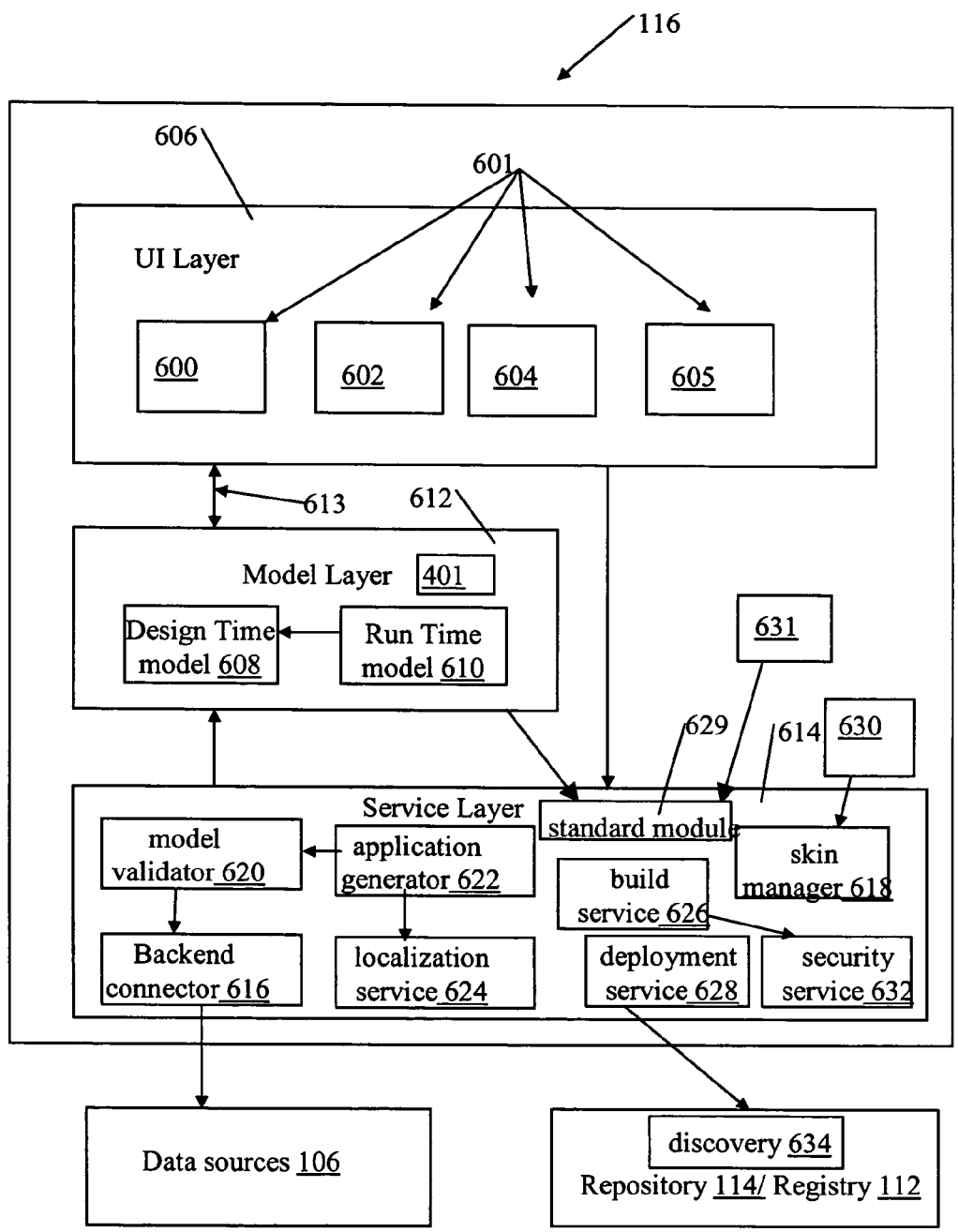
FIG. 6 is a block diagram of the tool architecture of FIG. 2.

Referring to FIGS. 2 and 6, Eclipse makes provisions for a basic, developer tool 116 environment that can be extended to provide custom editors, wizards, project management and a host of other functionality. The Eclipse Platform is designed for building integrated development environments (IDEs) that can be used to create applications as diverse as web sites, embedded Java TM programs, C++ programs, and Enterprise JavaBeans TM. The navigator view 230 shows files in a user's (e.g. developer) workspace; a text editor section 232 shows the content of a file being worked on by the user of the developer tool 116 to develop the application 105 and/or standard data components 401 in question; the tasks view section 234 shows a list of to-dos for the user of the developer tool 116; and the outline viewer section 236 shows for example a content outline of the application 105 and/or standard data components 401 being designed/edited, and/or may augment other views by providing information about the currently selected object such as properties of the object selected in another view. It is recognised that the developer tool 116 aids the developer in creating and modifying the coded definition content of the application 105 and/or standard data components 401, for example in a structured definition language (e.g. in XML). Further, the developer tool 116 also aids the developer in creating, modifying, and validating the interdependencies of the definition content between the application message/data and/or screen/data relationships included in the application 105 definition and the standard data components 401. It is also recognised that presentation on the display of wizard 604 and dialog 605 content for use by the developer (during use of the editors 600 and viewers 602) can be positioned in one of the sections 230, 232, 234, 236 and/or in a dedicated wizard section (not shown), as desired.

The Eclipse Platform is built on a mechanism for discovering, integrating, and running modules called plug-ins (i.e. editors 600 and viewers 602). When the Eclipse Platform is launched via the UI 202 of the computer 201, the user is presented with an integrated development environment (IDE) on the display 206 composed of the set of available plug-ins, such as editors 600 and viewers 602. The various plug-ins to the Eclipse Platform operate on regular files in the user's workspace indicated on the display 206. The workspace consists of one or more top-level projects, where each project maps to a corresponding user-specified directory in the file system, as stored in the memory 210 (and/or accessible on the network 10), which is navigated using the navigator 230. The Eclipse Platform UI paradigm is based on editors, views, and perspectives. From the user's standpoint, a workbench display 206 consists visually of views 602 and editors 600. Perspectives manifest themselves in the selection and arrangements of editors 600 and views 602 visible on the display 206. Editors 600 allow the user to open, edit, and save objects. The editors 600 follow an open-save-close lifecycle much like file system-based tools. When active, a selected editor 600 can contribute actions to a workbench menu and toolbar. Views 602 provide information about some object that the user is working with in the workbench. A viewer 602 may assist the editor 600 by providing information about the document being edited. For example, viewers 602 can have a simpler lifecycle than editors 600, whereby modifications made in using a viewer 602 (such as changing a property value) are generally saved immediately, and the changes are reflected immediately in other related parts of the display 206. It is also recognised that a workbench window of the display 206 can have several separate perspectives, only one of which is visible at any given moment. Each perspective has its own viewers 602 and editors 600 that are arranged (tiled, stacked, or detached) for presentation on the display 206.

Applications 105

For example, the applications 105 can be compiled applications for transmission to, and subsequent execution on, the device 100 or can be packages having application elements or artifacts such as but not limited to XML definitions, mappings, application resources, and optionally resource bundle (s) for localization support. XML file definitions can be XML coding of application data, messages, screens components (optionally workflow components), part of the raw uncompiled application 105. It is recognised that XML syntax is used only as an example of any structured definition language applicable to coding of the applications 105. The XML definitions may be produced either by the developer tool 116 generation phase, described below, or may be hand-coded by the developer as desired. The application XML definitions can be generically named and added to the top level (for example) of a jar file.

The resources are one or more resources (images, audio-clips, video clips, etc. . . . ) that are packaged with the application 105 as static dependencies. For example, resources can be located relative to a resources folder (not shown) such that a particular resource may contain its own relative path to the main folder (e.g. resources/icon.gif, resources/screens/cli-part_1.0/happyface.gif, and resources/soundbytes/midi/in-themood.midi). The resource bundles can contain localization information for each language supported by the application 105. These bundles can be located in a locale folder, for example, and can be named according to the language supported (e.g. locale/lang_en.properties and locale/lang_fr.properties).

Referring to FIG. 4, as an example only, the applications 105 can be component architecture-based software applications which can have artifacts written, for example, in eXtensible Markup Language (XML) and a subset of ECMAScript. XML and ECMAScript are standards-based languages, which allow software developers to develop the component applications 105 in a portable and platform-independent way. A block diagram of the component application 105 comprises the data components 400, the presentation components 402 and the message components 404, which are coordinated by workflow components 406 through interaction with the client runtime environment RE of the device 100 (see FIG. 1) once provisioned thereon. The structured definition language (e.g. XML) can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), U.S. Government Information Locator Service (GILS), Encoded Archives Description (EAD), Instructional Management System (IMS) Global Learning Consortium, and Australian Government Locator Service (AGLS). Encoding syntax allows the metadata of the components 400, 402, 404 to be processed by the runtime environment RE (see FIG. 1), and encoding schemes include schemes such as but not limited to XML, HTML, XHTML, XSML, RDF, Machine Readable Cataloging (MARC), and Multipurpose Internet Mail Extensions (MIME). The client runtime environment RE of the device 100 operates on the metadata descriptors of the components 400, 402, 404 to provision an executable version of the application 105.

Referring again to FIG. 4, the data components 400 define data entities, which are used by the application 105. Data components 400 define what information is required to describe the data entities, and in what format the information is expressed/stored. For example, the data component 400 may define information such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400. It is recognised that standard data components 401 (see FIG. 5) of the runtime environment RE can be similar in design and content to that of the data components 400 (or data components 401) of the application 105. Further, it is recognized that in the above described client component application 105 definitions hosting model, the standard data components 401 may vary depending on the client platform and environment of the device 100.

Referring again to FIG. 4, the message components 404 define the format of messages used by the component application 105 to communicate with external systems such as the web service. For example, one of the message components 404 may describe information such as but not limited to a message for placing an order, which includes the unique identifier for the order, the status of the order, and notes associated with the order. It is recognised that data definition content of the components can be shared for data 400 and message 404 components that are linked or otherwise contain similar data definitions. The message component 404 allows the message content to be evaluated to determine whether mandatory fields have been supplied in the message and to be sent to the data source 106 via the AG.

Referring again to FIG. 4, the presentation components 402 define the appearance and behavior of the component application 105 as it displayed by a user interface of the devices 100. The presentation components 402 can specify GUI screens and controls, and actions to be executed when the user interacts with the component application 105 using the user interface. For example, the presentation components 402 may define screens, labels, edit boxes, buttons and menus, and actions to be taken when the user types in an edit box or pushes a button. It is recognised that data definition content of the components can be shared for data 400 and presentation 402 components that are linked or otherwise contain similar data definitions.

Referring to FIGS. 1 and 4, it is recognized that in the above described client component application 10S definitions hosting model, the presentation components 402 may vary depending on the client platform and environment of the device 100. For example, in some cases Web Service consumers do not require a visual presentation. The application definition of the components 400, 402, 404, 406 of the component application 105 can be hosted in the Web Service repository 114 as a package bundle of platform-neutral data 400, message 404, workflow 406 component descriptors with a set of platform-specific presentation component 402 descriptors for various predefined client runtimes RE. When the discovery or deployment request message for the application 105 is issued, the client type would be specified as a part of this request message. In order not to duplicate data, message, and workflow metadata while packaging component application 105 for different client platforms of the communication devices 100, application definitions can be hosted as a bundle of platform-neutral component definitions linked with different sets of presentation components 402. For those Web Service consumers, the client application 105 would contain selected presentation components 402 linked with the data 400 and message 404 components through the workflow components 406.

Referring again to FIG. 4, the workflow components 406 of the component application 105 define processing that occurs when an action is to be performed, such as an action specified by a presentation component 402 as described above, or an action to be performed when messages arrive from the application gateway AG (see FIG. 1). Presentation, workflow and message processing are defined by the workflow components 406. The workflow components 406 are written as a series of instructions in a programming language (e.g. object oriented programming language) and/or a scripting language, such as but not limited to ECMAScript, and can be (for example) compiled into native code and executed by the runtime environment RE, as described above. An example of the workflow components 406 may be to assign values to data, manipulate screens, or send the message 105. As with presentation components, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the facilities of an existing system, such as the devices 100.

Referring to FIG. 4, the application 105 is structured, for example, using component architecture such that when the device 100 (see FIG. 1) receives a response message from the application gateway AG containing message data, the appropriate workflow component 406 interprets the data content of the message according to the appropriate message component 404 definitions. The workflow component 406 then processes the data content and inserts the data into the corresponding data component 400 for subsequent storage in the device 100. Further, if needed, the workflow component 406 also inserts the data into the appropriate presentation component 402 for subsequent display on the display of the device 100. A further example of the component architecture of the applications 105 is for data input by a user of the device 100, such as pushing a button or selecting a menu item. The relevant workflow component 406 interprets the input data according to the appropriate presentation component 404 and creates data entities, which are defined by the appropriate data components 400. The workflow component 406 then populates the data components 400 with the input data provided by the user for subsequent storage in the device 100. Further, the workflow component 406 also inserts the input data into the appropriate message component 404 for subsequent sending of the input data as data entities to the data source 106, web service for example, as defined by the message component 404.

An example component application 105 represented in XML and mEScript could be as follows, including data components 400 as "wcData" and message components 404 content as "wcMsg",:

```
<wcData name="User">
    <dfield name="name" type="String" key="1"/>
    <dfield name="passwordHash" type="String"/>
    <dfield name="street" type="String"/>
    <dfield name="city" type="String"/>
    <dfield name="postal" type="String"/>
    <dfield name="phone" type="String"/>
</wcData>
<wcData name="OrderStatus">
    <dfield name="confNumber" type="Number" key="1"/>
    <dfield name="status" type="String"/>
    <dfield name="datetime" type="Date"/>
</wcData>
<wcData name="Order">
    <dfield name="orderId" type="Number" key="1"/>
    <dfield name="special" type="String"/>
    <dfield name="user" cmp="true" cmpName="User"/>
    <dfield name="datetime" type="Date"/>
    <dfield name="orderStatus" cmp="true" cmpName="OrderStatus"/>
</wcData>
<wcData name="Special">
    <dfield name="desc" key="1" type="String"/>
    <dfield name="price" type="Number"/>
</wcData>
<wcMsg name="inAddSpecial" mapping="Special">
</wcMsg>
<wcMsg name="inRemoveSpecial" pblock="mhRemoveSpecial">
    <mfield name="desc" mapping="Special.desc"/>
</wcMsg>
<wcMsg name="inOrderStatus">
    <mfield name="orderId" mapping="Order.orderId"/>
    <mfield name="status" mapping="Order.orderStatus"/>
</wcMsg>
<wcMsg name="inUserInfo" mapping="User">
</wcMsg>
<wcMsg name="outOrder">
    <mfield name="special" mapping="Order.special"/>
    <mfield name="user" mapping="Order.user"/>
    <mfield name="datetime" mapping="Order.datetime"/>
</wcMsg>
```

As given above, the XML wcData element content defines the example data component 400 content, which is comprised of a group of named, typed fields. The wcMsg element content defines the example message component 404, which similarly defines a group of named, typed fields.

Development Tool 116 Architecture

FIG. 6 illustrates the overall developer tool 116 structure for designing applications 105 and/or the standard data components 401. The developer tool 116 interface (UI 202 and display 206—see FIG. 2) is primarily a user-facing module 601 collection of graphical and text editors 600, viewers 602, dialogs 605 and wizards 604. The large majority of external interactions are accomplished through one or more of these editors 600, with the developer/user, using a system of drag and drop editing and wizard driven elaboration. The secondary and non-user facing system interface is that of the "Backend", whereby the developer tool 116 connects to and digests data source 106 services such as Web Services and SQL Databases. As described above, the developer tool 116 can be built on the Eclipse platform, whereby the user interface system components can be such as but not limited to components of editors 600, viewers 602, dialogs (not shown) and wizards 604, which are plug-in modules 601 that extend Eclipse classes and utilize the Eclipse framework, for example. As shown, the developer tool 116 communicates with Backend data sources 106 and UDDI repositories 114 and registries 112. These external systems 106, 112, 114 may not be part of the developer tool 116 but are shown for completeness.

UI Layer 606

The developer tool 116 has a UI Layer 606 composed mainly of the editors 600 and viewers 602, which are assisted through the workflow wizards 605. The layer 606 has access to an extensive widget set and graphics library known as the Standard Widget Toolkit (SWT), for Eclipse. The UI layer 606 modules 601 can also make use of a higher-level toolkit called JFace that contains standard viewer classes such as lists, trees and tables and an action framework used to add commands to menus and toolbars. The developer tool 116 can also use a Graphical Editing Framework (GEF) to implement diagramming editors. The UI layer 606 modules 601 can follow the Model-View-Controller design pattern where each module 601 is both a view and a controller. Data models 608,610 represents the persistent state of the application 105 and are implemented in the data model layer 612 the developer tool 116 architecture. The separation of the layers 606, 612 keeps presentation specific information in the various views and provides for multiple UI modules 601 (e.g. editors 600 and viewers 602) to respond to data model 608,610 changes. Operation by the developer of the editors 600 and viewers 602 on the display 202 (see FIG. 2) can be assisted by the wizards 604 for guiding the development of the application 105 and/or standard data components 401.

Referring to FIG. 6, the UI Layer 606 is comprised of the set of editors 600, viewers 602, wizards 604 and dialogs 605. The UI Layer 606 uses the Model-View-Controller (MVC) pattern where each UI module 601 is both a View and a Controller. UI Layer modules 601 interact with data models 608,610 with some related control logic as defined by the MVC pattern. The editors 600 are modules 601 that do not commit model 608,610 changes until the user of the developer tool 116 chooses to "Save" them. Viewers 602 are modules 601 that commit their changes to the model 608,612 immediately when the user makes them. Wizards 604 are modules 601 that are step-driven by a series of one or more dialogs 605, wherein each dialog 605 gathers certain information from the user of the developer tool 116 via the user interface 202 (see FIG. 2). No changes are applied to the design time model 608 using the wizards 604 until the user of the developer tool 116 selects a confirmation button like a "Finish". It is recognised in the example plug-in developer tool 116 environment, modules 601 can extend two types of interfaces: Eclipse extension points and extension point interfaces. Extension points declare a unique package or plug-in already defined in the system as the entry point for functional extension, e.g. an editor 600, wizard 604 or project. Extension point interfaces allow the developer tool 116 to define its own plug-in interfaces, e.g. for skins 618 and backend 616 connectors, as further described below.

Data Models 608, 610

The developer tool 116 data models 608,610 are based, by example, on the Eclipse Modeling Framework (EMF). It is recognised that other modeling frameworks can be used, as desired. The framework provides model 608, 610 change notification, persistence support and an efficient reflective API for manipulating EMF objects generically. The code generation facility is used to generate the model 608, 610 implementation and create adapters to connect a model layer 612 with the user interface modules 601 of the UI layer 606.

Referring again to FIG. 6, modules 601 (primarily Editors 600 and Viewers 602) in the developer tool 116 are observers of the data models 608,610 and are used to interact or otherwise test and modify the data models 608,610 of the application (e.g. components 400, 402, 404, 406—see FIG. 4) and standard data components 401 (see FIG. 5) in question. It is recognised that the components 400, 402, 404, 406 of the application 105 and the standard data components 401 preferably of the runtime environment RE can be incorporated as a set in the data models 608,610, in order to test the interoperability of the components 400, 401, 402, 404, 406 as needed by the developer when using the developer tool 116. When the data model 608,610 changes, the models 608,610 are notified and respond by updating the presentation of the application 105. The developer tool 116 uses the Eclipse Modeling Framework (EMF), for example, to connect the Eclipse UI framework to the developer tool 116 data model 608,610, whereby the modules 601 can use the standard Eclipse interfaces to provide the information to display and edit an object on the display 206 (see FIG. 2). In general, the EMF framework implements these standard interfaces and adapt calls to these interfaces by calling on generated adapters that know how to access the data model 608,610 residing in memory 210. The design time Data Model 608 is used to represent the current version of the application 105 (e.g. an application module) in development along with the standard data components 401 and is accessed by the users employing the modules 601 to interact with associated data of the model 608. Modules 601 can also trigger validation actions on the Design Time Data Model 608. Modules 601 can also cause some or all of the application 105 to be generated from the Design Time Data Model 608 resident in memory 210. In general, the Design Time Data Model 608 accepts a set of commands via the UI 202 (see FIG. 2) that affect the state of the model 608, and in response may generate a set of events. Each module 601 (editor 600 and viewer 602) described includes the set of commands and the events that affect the module 601 and data model 608 pairing.

Referring to FIG. 6, the Runtime Data Model 610 represents the state of an emulated application 105 under development by the developer tool 116, using as a basis the contents of the design-time data model 608. The runtime data model 610 stores values for the following major items, such as but not limited to: standard data components 401; Data Components 400 (see FIG. 4); Global Variables; Message Components 404; Resources; Screen Components 402 and Styles. The Runtime Data Model 610 collaborates with the Design-Time Data Model 608 and a Testing/Preview viewer (not shown) during emulation of application 105 for testing and preview purposes (for example). The viewer also collaborates with the skin manager 616 for emulating the runtime data model 610 for a specified device 100 type. The Runtime Data Model 610 also notifies, through a bridge 613, the viewer as well as any other modules 601 of the UI layer 606 associated with changes made to the model 610. For example, an API call can be used as a notifier for the associated modules 601 when the state of the model 610 has changed. The Design Time Data Model 608 represents the state of an application 105 development project and interacts with the modules 601 of the UI layer 606 by notifying modules 601 when the state of the model 608 has changed as well as saving and loading objects from storage 210. The model's 608 primary responsibility is to define the applications 105 including such as but not limited to the following items: standard data components 401; Data Component 400. Definitions; Global Variable Definitions; Message Component 404 Definitions; Resource 304, 306 Definitions; Screen Component 402 Definitions; Scripts 406; Style Definitions and Backend data source 106 Mapping 302 Descriptors. The Design Time Data Model 608 responds to commands of each editor 600, viewer 602. The Design Time Data Model 608 also fires events to modules 601 in response to changes in the model 608, as well as collaborating/communicating with the other modules 601 (module 601-module 601 interaction) by notifying respective modules 601 when the data model 608 has changed. The data model 608 depends on an interface in order to serialize model 608 content retrieval and storage to and from the memory 210.

The above describes the mechanism used by the developer tool 116 editors 600 and viewers 602 to interact with the models 608,610. The EMF.Edit framework is an optional framework provided by the Eclipse framework. The developer tool 116 can use the EMF.Edit framework and generated code (for example) as a bridge or coupling 613 between the Eclipse UI framework and the tool models 608,610. Following the Model-View-Controller pattern, the editors 600 and viewers 602 do not know about the models 608,610 directly but rely on interfaces to provide the information needed to display and edit.

Standard Data Components 401

It is recognised that the SDCs 401 could be part of the skin manager 618 for emulating the runtime environment RE of the device 100 and/or the SDCs 401 could be part of the application model layer 612 (see FIG. 6), along with the model 608 of the application 105 including application elements such as but not limited to component 400, 402, 404, 406 metadata descriptions as well as at least a reference (e.g. mapping) to the SDC 401. In general, the SDCs 401 are built by a standard component module 629 using knowledge of the properties, stored in a native module 631, such as but not limited to: the data structures of the NDAs 704 (e.g. the NADEs 700), and/or the communication interface of the respective APIs 704, as well as those data structures used by the device 100 for storing the NADEs 700 in the memory 1210 of the device 100. The application developer creates the SDCs 401 using the module 629 of the developer tool 116, whereby the runtime environment RE utilizes the SDCs 401 information during execution of the application 105 when accessing the data of the NDAs 704. The SDCs 401 can be generated as an annotation to the application 105 metadata, or for example the SDCs 401 can be included as a separate file instead for inclusion in a representative runtime environment RE module for implementation on the device 100.

Service Layer 614

Referring again to FIG. 6, a service layer 614 provides facilities for the UI layer 606 such as validation 620, localization 624, generation 622, build 626, standard data component module 629 and deployment 628, further described below. The developer tool 116 can make use of the Eclipse extension point mechanism to load additional plug-ins for two types of services: backend connectors 616 and device skin managers 618 with associated presentation environments 630.

The backend connector 616 defines an Eclipse extension point to provide for the developer tool 116 to communicate with or otherwise obtain information about different backend data sources 106, in order to obtain the message format (e.g. as provided by WSDL definitions) of the selected data source 106. The backend connector 616 can be used as an interface to connect to and to investigate backend data source 106 services such as Web Services and SQL Databases. The backend connector 616 facilitates building a suitable application message and data set to permit communication with these services from the application 105 when running on the device 100. The backend connector 616 can support the access to multiple different types of data sources 106, such as but not limited to exposing respective direct communication interfaces through a communication connector-based architecture. At runtime the developer tool 116 reads the plug-in registry to add contributed backend extensions to the set of backend connectors 616, such as but not limited to connectors for Web Services.

The Backend Connector 616 can be responsible for such as but not limited to: connecting to a selected one (or more) of the backend data sources 106 (e.g. Web Service, Database); providing an interface for accessing the description of the backend data source 106 (e.g. messages, operations, and data types); and/or providing for the identification of Notification services (those which push notifications over the network 10 to the device 100—see FIG. 1). The Backend Connector 616 can provide an interface to the backend data source 106 (e.g. a web service, SQL Database or other) for access of the data source 106 description, and can provide a level of abstraction between implementation specific details of the backend messaging and generic messaging descriptions. For example, the Backend Connector 616 can be used to generate appropriate messaging 404 and data 400 component (e.g. data elements) sets for the application 105, and is used by the Model Validator 620 as part of validation tasks to verify models 608,610 with standard data components 401 under development. For example, the backend connector 616 can be implemented as an interface using an API call as the protocol to access the underlying backend data source 106 (e.g. using a WSDL Interface for Web Services). It is recognised that the data source 106 information accessed through the connector 616 can be used to help construct the standard data components 401, as further described below.

The device skin manager 618 defines an Eclipse extension point, for example, to allow the developer tool 116 to emulate different devices 100 (see FIG. 1), such that the look and feel of different target devices 100 (of the application 105) can be specified. At runtime the developer tool 116 reads the plug-in registry to add contributed skin extensions or presentation environments 630 to the set of device environments 630 coordinated by the manager 618, such as but not limited to environments 630 for a generic BlackBerry™ or other device 100. The Skin Manager 618 is used by the Testing/Preview viewer 806 to load visual elements of the data model 608,610 that look appropriate for the device 100 that is being emulated, i.e. elements that are compatible with the specified environment 630. Different skins or presentation environments/formats 630 are "pluggable" into the manager 618 of the developer tool 116, meaning that third parties can implement their own presentation environments 630 by creating new unique SkinIds (an Eclipse extension point), for example, and implementing an appropriate interface to create instances of the screen elements supported by the runtime environment RE of the emulated device 100. In order to load a new presentation environment 630, the Testing/Preview viewer 806 first asks the Manager 618 for an instance of the specified environment 630. The Manager 618 then instantiates the environment 630 and the Testing/Preview viewer 806 uses the specified environment 630 to construct the screen elements according to the screen components of the model 608,610. For example, the presentation environments 630 (e.g. SkinPlugins) are identified to the SkinManager 618 through a custom Eclipse extension point using the Eclipse framework.

The model validation 620 of the service layer 614 provides facilities for the UI layer 606 such as validating the design time data model 608 and/or the standard data components 401. The Model Validator 620 is used to check that the representation of application 105 messages is in line with the backend data source 106 presentation of messaging operations. The Model Validator 620 can be responsible to validate the model 608 representation of the application 105 to be generated, for example such as but not limited to elements of: workflow sanity of the workflow component 406; consistency of parameters and field level mappings of the components 400, 402, 404, 406; screen control mappings and screen refresh messages of the screen components 402; message and/or data duplications inter and intra component 400, 401, 402, 404, 406. In order to achieve its responsibilities, the validator collaborates with the Design Time Data Model 608, the message structures 302, 304, an application generator 622 and the backend connector 616. The Model Validator 620 utilizes as part of the validation task the Design Time Data Model 608 (for application 105 validation) and the message structures 302, 304, as well as the backend connector 616, which supports the interface to the backend data sources 106.

Referring again to FIG. 6, the localization Service 624 has responsibilities such as but not limited to: supporting a build time localization of user visible strings; supporting additional localization settings (e.g. default time & date display format, default number display format, display currency format, etc); and creating the resource bundle files (and resources) that can be used during preparation of the deployable application 105 (e.g. an application jar file) by a Build Service 626. For example, the localization service 624 can be implemented as a resource module for collecting resources that are resident in the design time data model 608 for inclusion in the deployable application 105. The JAR file can be a file that contains the class, image, and sound files for the application gathered into a single file and compressed for efficient downloading to the device 100. The Localization Service 624 is used by the application Generator 622 to produce the language specific resource bundles, for example. The Build Service 626 implements preparation of the resource bundles and packaging the resource bundles with the deployable application 105. The Localization Service 624 interacts (provides an interface) with the tool editors 600 and viewers 602 for setting or otherwise manipulating language strings and locale settings of the application 105.

Referring to FIG. 6, the Generator 622 can be responsible for, such as but not limited to: generation of the application XML from the components 400, 401, 402, 404; optimizing field ordering of the component 400, 401, 402, 404 descriptors; and generation of dependencies and script transformation as desired for storage in the memory 210. The Generator 622 collaborates with the Design Time Data Model 608 to obtain the content of the developed components 400, 402, 404 comprising the application 105, as well as cooperating with the standard data components 401. The Generator 622 utilizes the Model Validator 620 to check that both the application 105 definitions (of the components 400, 401, 402, 404, 406) are correct. The Generator 620 then produces the XML code of the application 105, with inclusions and/or augmentations of the script of the workflow components 406, and/or the standard data components 401 file descriptors (used by the runtime environment RE). The Generator 622 uses the Localization Service 624 to produce the language resource bundles, through for example a Resource Bundles interface (not shown). The Generator 622 generation process can be kicked off through a Generate interface accessed by the developer using the UI 202 of the developer tool 116 (i.e. by user input events such as mouse clicks and/or key presses). It is recognised that the generator 622 can be configured as a collection of modules, such as but not limited to a code module for generating the XML (which may include associated script). It is recognised that the standard data components 401 can be developed while the application 105 is in development, or can be developed once the application 105 development is complete.

The deployment service 628 is used to deploy the appropriate application 105 descriptor file with respect to the repository 114 and registry 112 and/or to deploy the standard data components 401 (for example as part of a published runtime environment RE module 300 upgrade or for incorporation as original operating software supplied with the device 100 when provided to the user). The Build Service 626 provides a mechanism for building the deployable form of the application 105 and/or the runtime environment RE module 300. The Build Service 626 produces via a build engine the deployable application 105 file and/or the runtime environment RE module 300 file. These files are made available to the deployment service 628 via an output interface of the developer tool 116. The security service 632, has the ability to sign the application 105 file and/or the runtime environment RE module 300 file to prevent tampering with their contents, and to provide the identity of the originator. There can be two example options for signing, either making use of DSA with SHA1 digest, or RSA with MD5, as is know in the art. For example, the security service 632 can handle certificates that are used for application 105 and/or mapping model file signing. The security service 632 can have the ability to request, store and use a public/private key pair to help ensure the validity of both the originator and content of the application 105 and/or runtime environment RE module 300 files as deployed.

Figure 7:
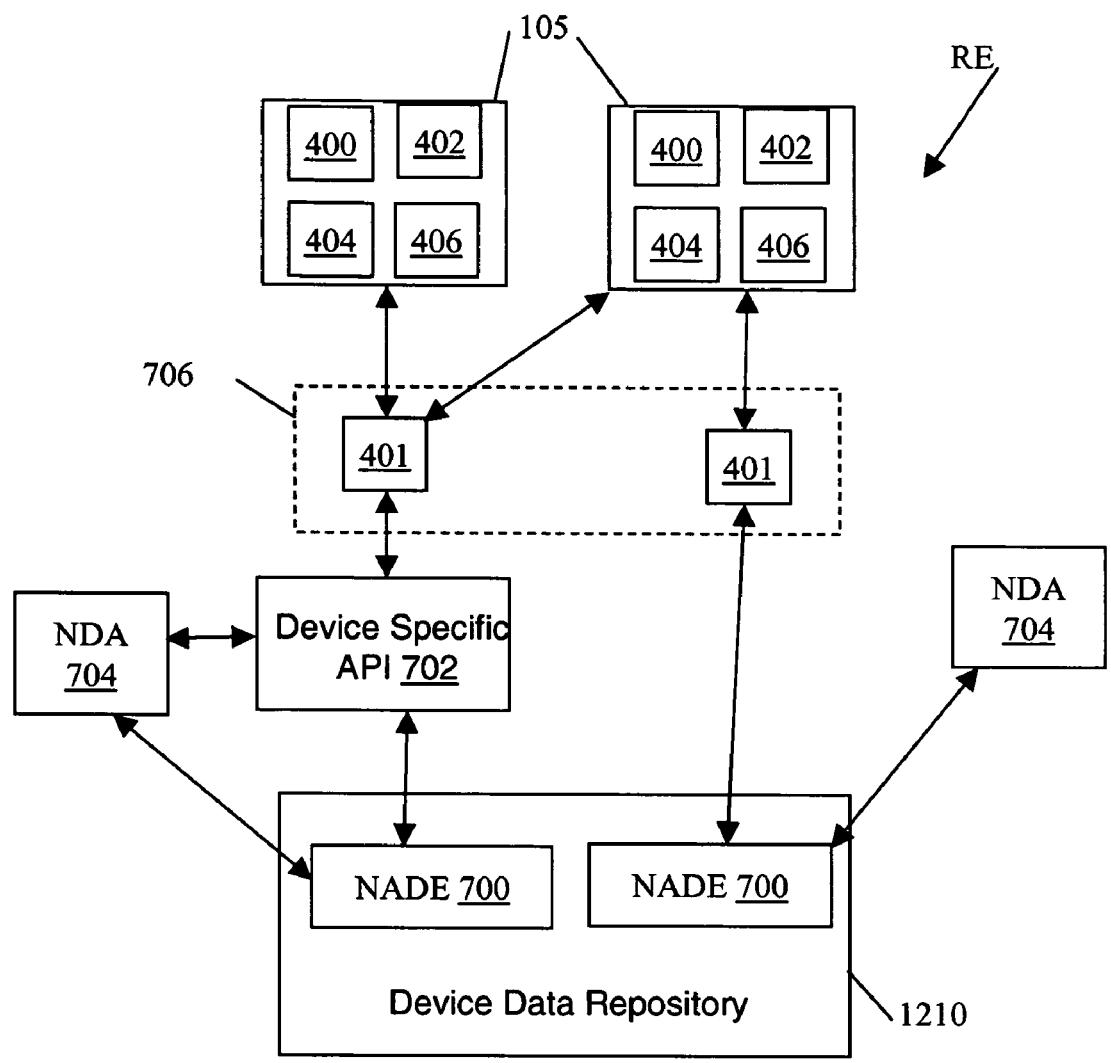
FIG. 7 is a further embodiment of the runtime environment of FIG. 5.

FIG. 7 shows an example configuration of the runtime environment RE having a plurality of provisioned (e.g. in executable form) component-based applications 105 (consisting of data 400, presentation 402, message 404, workflow 406, or an alternate combination thereof) interacting with one or more commonly provisioned standard data components (SDCs) 401. It is recognised that the SDCs 401 can be represented as a set 706 of SDCs 401, such that the SDC 401 content of the set 706 is either static (e.g. part of the runtime environment RE as provided globally by the device 100) or dynamic (e.g. updatable based on the type of applications 105 provisioned or otherwise stored on the device 100 change). The standard data components 401 provide access to native device application data entities (NADEs) 700 by either invoking native device-dependent APIs 702 or by making data requests directly to device memory 1210 (i.e. device data repositories for native device applications NDA 704). The APIs 702 are specific methods prescribed by the native device application 704 (or the device operating system as desired) by which the SDC 401 can make requests of the native device application 704. Examples of APIs include such as but not limited to ODMA (Open Document Management API) and SAX (Simple API for XML). The NDAs 704 are typically non-component-based applications and normally require the APIs 704 for accessing their functionality and corresponding NADEs 700. Examples of the NDAs can include such as but not limited to Microsoft Outlook TM having features of contacts, email, tasks, calendar, appointments with corresponding NADEs 700.

As described above, the component applications 105 are constructed by the developer tool 116 in a component-based means with a plurality of interacting components 400, 402, 404, 406. Preferably, runtime elements of the applications 105 are defined as provisioned components (for example as described above) in the runtime environment RE. In one embodiment, the applications 105 comprise a data component 400, components of other types (e.g. components 402, 404, 406) and reference and/or inclusion of the SDCs 401 for representing shared (by multiple applications 105) standard data definitions for accessing the NADEs 700. Each component 400, 401, 402, 404, 406 is of a specific type, which is associated with predefined behaviors or functions. For example, each data component 400 could be created, deleted, updated, and its field values can be retrieved and/or set. In one embodiment of the component applications 105, three types of components include: (i) data component 400 having behaviors to create, remove, load, persistent, update; (ii) message component 404 having a send or transmit behaviour; and (iii) screen component 402 having behaviours to display, refresh, close displayed elements on the UI 1202 of the device 100.

The component-based applications 105 are preferably provided shared access to the NADEs 700 of the native device applications 704 through the preferably shared SDCs 401 provisioned in the runtime environment RE. The SDCs 401 can be provisioned as part of the application 105 (i.e. multiple copies of the SDC 401 for each of the provisioned applications 105) or as part of the runtime environment RE and therefore shared by multiple applications 105 (i.e. a single copy of the SDC 401 shared by multiple provisioned applications 105). It is noted that the SDC 401 XML definitions can be included as part of the runtime environment RE module implemented on the device 100 for access to all provisioned applications 105 (similar in function to the common set of services 304 provided to the applications 105—see FIG. 5) and therefore the SDCs 401 are only referenced for example by name in the XML definitions/metadata of the component applications 105. Another SDC 401 implementation embodiment would be for the XML definitions/metadata of the SDC 401 to be part of the application 105 XML definitions/metadata but only one copy is provisioned in the runtime environment RE for sharing by the plurality of the component applications provisioned in the runtime environment RE. In this case, the runtime environment RE would have knowledge of the sharable SDCs 401 and would only provision the first copy of a particular SDC 401 while other provisioning requests would be denied and instead access given to the already provisioned initial SDC 401. In any of the manners described above, access to the NADEs 700 of the NDAs 704 would be provided to the component applications 105 via the SDCs 401.

Figure 8:
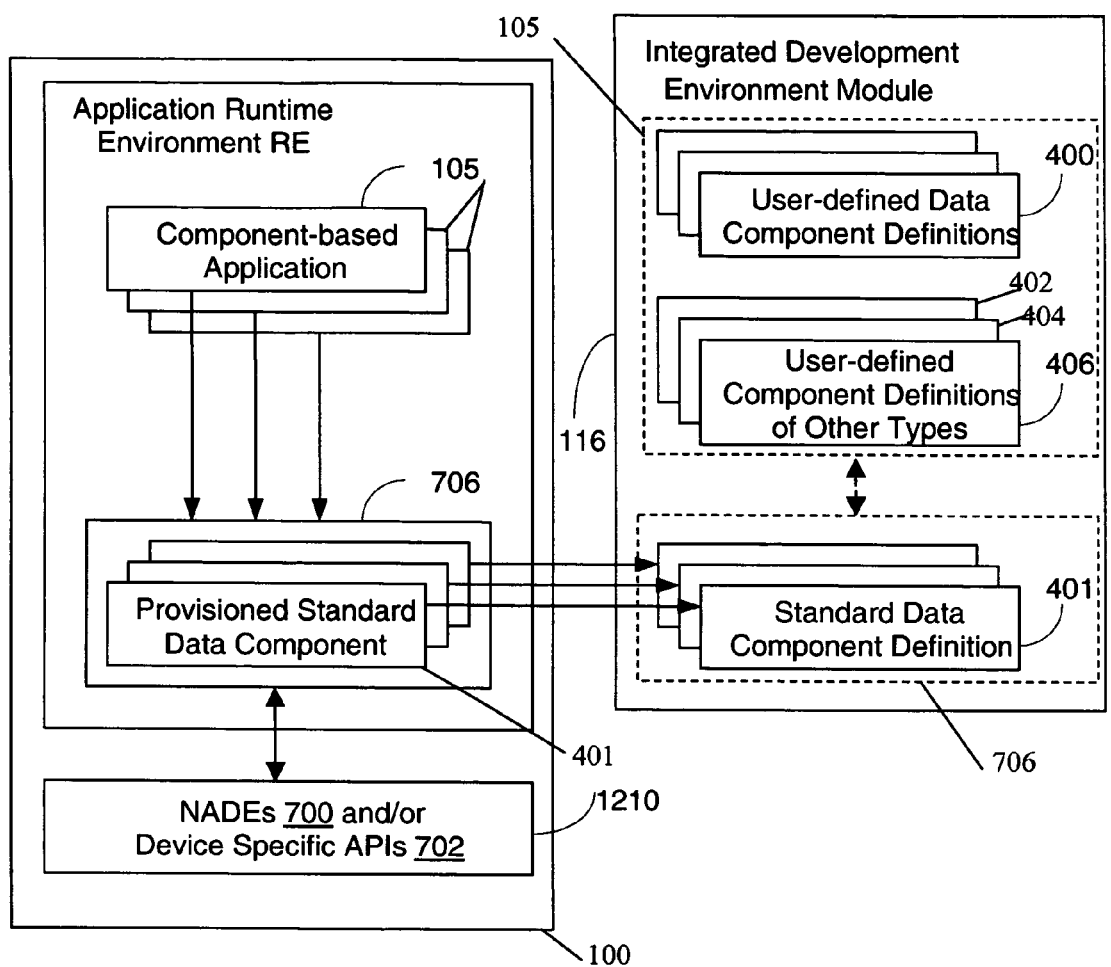
FIG. 8 shows an example representation of cooperation between the runtime environment and the tool of FIG. 1.

FIG. 8 demonstrates the symbolic interrelationship between the runtime environment RE for hosting component-based applications 105 on the device 105 in cooperation with the provisioned SDCs 401 and the integrated developer tool 116 for developing the component application 105 definitions in conjunction with developing the SDC 401 definitions. The device 100 also provides the memory 1210 for storage of the NADEs 700 accessed by the provisioned component applications 105 through the provisioned SDCs 401. It is recognised that knowledge of the common set 706 of standard data component SDC 401 definitions is shared by the developer tool 116. Accordingly, the SDCs 401 are treated as built-in data components for the component applications 105. The definitions of SDCs 401 are standardized to a specific series of devices or devices of a specific manufacturer, and are encompassed by the developer tool 116 during application 105 development and are executed by the runtime environment RE. The SDCs 401 act/react similarly to developer-defined data components 400 as far as the other components 402, 404, 406 of the application 105 are concerned, but the SDCs 401 also interface as a "front-end" to the data of the NDAs 704 stored in the respective NADEs 700, accessed either directly or indirectly through the APIs 702 of the NDAs 704 and/or the operating system of the device infrastructure 1204 (see FIG. 3). It is recognised that the development of the applications 105 coupled to the SDCs 401 can be facilitated through use of the standard module 629 of the tool for developing the SDCs 401 along with the model layer 612 in conjunction with the skin manager 618 with selected presentation environments 630 for simulating the runtime environments RE of the device 100.

It is recognised that knowledge of the API 704 features (e.g. callable functions and call format) must be made available to the user of the developer tool 116 when developing the SDCs 401, in the case where the APIs 702 are used to access the NADEs 700 through the NDAs 704. Otherwise, knowledge of the storage format and content, for example, of the NADEs 700 are made available to the user of the developer tool 116 when developing the SDCs 401, in order for inclusion in the definitions of the SDCs 401 to enable direct access by the applications 105 (e.g. such as in interaction between components 400, 402, 404, 406 with the appropriate SDC 401) of the NADE 700 data content. Accordingly, in either case (direct or indirect access of the NADEs 700) the SDCs 401 are treated as another version of the application 105 data components 400 described above. It should be noted that in both access cases, the runtime environment RE would have knowledge of the storage location of the NADEs 700 in the storage 1210, for example as monitored by the persistence service 310 of the services framework 304 (see FIG. 5). Otherwise, the runtime environment RE would rely upon the operating system of the device infrastructure 1204 for information on the storage location of the NADEs 700 in the memory 1210.

As shown symbolically in FIG. 8, the runtime environment RE and the developer tool 116 share the common set 706 of standard data component 401 definitions. It is recognised that the developer tool 116 can have multiple sets 706 for different devices 100 and combinations of component applications 105, and/or can have a master set 706 for use in developing all envisioned component applications 105 for all envisioned runtime environments RE of selected devices 100. The runtime environments RE provides a runtime context and implementation of the SCDs 401, while the developer tool 116 offers application developers the facilities of accessing and embedding or otherwise associating the definitions of the SCDs 401 into/with the component applications 105 in the development stage. Further, it is recognised that the SDCs 401 content of the runtime environments RE and the developer tool 116 are to be in sync, in order to provide for proper implementation of the developed applications 105 coupled to the SDCs 401. Furthermore, different versions of the SDCs 401 could be developed by the developer tool 116 for different targeted runtime environments RE and devices 100.

Furthermore, it is recognised that certain Functions that are not available through the device APIs 702 can be incorporated as behaviours or functions of the data components 400, which automatically become available to SDCs 401 during execution of the now coupled components 400, 402, 404, 406 of the application 105 with the SDC 401. For example, in the development of the application 105 with built-in SDCs 401, search functions can be defined and incorporated into the data components 400, which the become available to any SDC 401 cooperating with the application components 400, 402, 404, 406 during access of the NADEs 700. For example, a Contact search function is usually not directly available through the device API 702. Without built-in SDCs 401, the developer may have to implement the search function for each of the NADEs 700, and the code written is not sharable among device applications 105 that require the same function. It is recognised that the additional functionality desired could also be incorporated in the SDCs 401 themselves, as desired or shared between the data components 400 and the SDCs 401.

Further, it is recognised that the additional functionality could include searching across a grouping of NADEs 700—i.e. the SDC 401 accesses data from a plurality of the NDAs 704 of the corresponding NADEs 700. With respect to the data component 400, along with the aforementioned behaviours for individual data components 400, the search function (or other additional desired functionality/features) may be available to a set of the data components 400, or a data collection.

Figure 9:
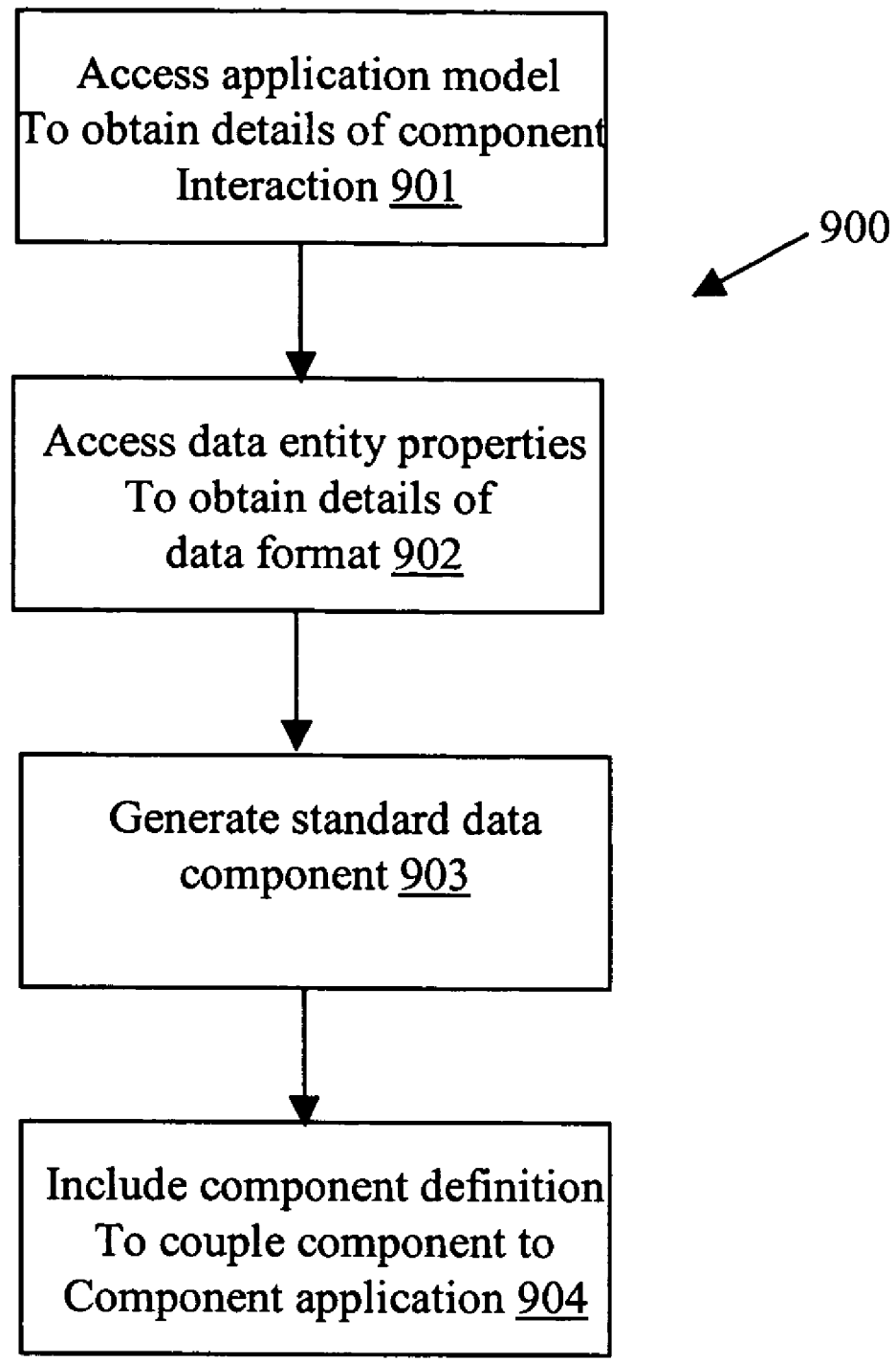
FIG. 9 is a flowchart of the design process of the standard data components of FIG. 8.

Referring to FIG. 9, a generation process 900 of the standard data component 401 in conjunction with information on the component application 105 and the properties of the data entity NADE 700 is shown, including steps such as but not limited to:

step 901—accessing the model 608 of the component-based application 105 including features of data 400 and message 404 component definitions expressed in the structured definition language;

step 902—accessing properties of the data entity 700 of the native application 704 from the native module 631;

step 903—generating the standard data component 401 definition based on the features of the component-based application 105 and the properties of the data entity 700 of the native application 700, the standard data component 401 definition expressed in the structured definition language; and step 904—incorporating the standard data component 401 definition into either the component-based application 105 definitions or the runtime environment RE module for execution on the device 100.

Advantageously, in the component-based application 105, the access to the built-in data repository NADEs 700 of the device 100 is presented as access through standard data components SDCs 401, thereby helping to reduce the need for additional and non-reusable (between device applications 105) code in each application 105 as could be the case for a traditional application 704 exposing the access as device APIs 702. Moreover, when developing the component application 105 coupled to SDCs 401, the developer may not have to use platform-dependent APIs 702 and implement corresponding code to access standard data repositories NADEs 700 (e.g., Contact, Email, Task, etc.) as is usually inevitable for the traditional applications NDAs 704. Advantageously, by cooperating with SDCs 401 in a manner used for the other data components 400, the interacting components 400, 402, 404, 406 of the application 105 can access the data in the NADEs 700, such as but not limited to data being created, modified, deleted, and/or searched in a device-independent manner.

The developer tool 116 system and methods described above may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via the communication network 102. Such a computer readable memory and a computer data signal are also within the scope of the present invention, as well as the hardware, software and the combination thereof. While particular embodiments of the present invention have been shown and described, changes and modifications may be made to such embodiments without departing from the true scope of the invention.

The embodiments of the invention in which an exclusive property of privilege is claimed are defined as the follows:

1. A system for developing a standard data component for coupling with a plurality of components of a component-based application to access a stored data entity of a non-component-based native application, the applications having the plurality of components including metadata descriptors expressed in a structured definition language for defining execution of the application in a runtime environment of a device, the system comprising:
a computer readable memory for storing instructions; and
a processor for executing the instructions stored in the computer readable memory, the instructions, when executed by the processor, providing:
an application module configured for storing a model of the component-based application including features of data and message metadata descriptors expressed in the structured definition language;
a native module configured for storing properties of the data entity of the native application; and
a standard module for generating the standard data component definition as additional metadata descriptors based on the features of the component-based application and the properties of the data entity of the native application, the additional metadata descriptors of the standard data component definition being expressed in the structured definition language,
wherein the application module is configured for including a reference to the standard data component definition in the metadata descriptors of the plurality of components, such that the standard data component definition is external to the metadata descriptors of the plurality of components and therefore the standard data component definition is configured for remote access through the reference;
wherein the additional metadata descriptors of the standard data component include an ability to invoke APIs of the non-component-based native application for accessing the stored data entity.

2. The system of claim 1, wherein the properties of the data entity are selected from the group comprising: a description of a data structure of the native application; a description of a communication interface of a respective application program interface of the native application; and a description of the data structure used by the device for storing the data entity in a device memory.

3. The system of claim 2, wherein the additional metadata descriptors of the standard data component include an ability to directly access the stored data entity through a data request to the device memory.

4. The system of claim 2, wherein the plurality of components are selected from the group comprising: a data component, a message component, a workflow component, and a presentation component.

5. The system of claim 4, wherein the additional metadata descriptors are configurable to be operatively coupled to the plurality of components through the metadata descriptors of the plurality of components.

6. The system of claim 2 further comprising a runtime emulator module for emulating the runtime environment of the device during development of the standard data component, the standard data component configured for providing a plurality of the component-based applications access to the data entity of the native application.

7. The system of claim 6, wherein the application module is configured for including the additional metadata descriptors of the standard data component in the metadata descriptors of the component-based application model.

8. The system of claim 1 further comprising the standard module configured for
generating a runtime environment module for including the additional metadata descriptors of the standard data component.

9. A method for developing a standard data component for coupling with a plurality of components of a component-based application to access a stored data entity of a non-component-based native application, the applications having the plurality of components including metadata descriptors expressed in a structured definition language for defining execution of the application in a runtime environment of a device, the method comprising executing instructions stored in a computer readable memory, the instructions for:
accessing a model of the component-based application including features of data and message component metadata descriptors expressed in the structured definition language;
accessing properties of the data entity of the native application; and generating the standard data component definition as additional metadata descriptors based on the features of the component-based application and the properties of the data entity of the native application, the additional metadata descriptors of the standard data component definition being expressed in the structured definition language; and
including a reference to the standard data component definition in the metadata descriptors of the plurality of components, such that the standard data component definition is external to the metadata descriptors of the plurality of components and therefore the standard data component definition is configured for remote access through the reference;
wherein the additional metadata descriptors of the standard data component include an ability to invoke APIs of the non-component-based native application for accessing the stored data entity.

10. The method of claim 9, wherein the properties of the data entity are selected from the group comprising: a description of a data structure of the native application; a description of a communication interface of a respective application program interface of the native application; and a description of the data structure used by the device for storing the data entity in a device memory.

11. The method of claim 10 further comprising the step of emulating the runtime environment of the device during development of the standard data component, the standard data component configured for providing a plurality of the component-based applications access to the data entity of the native application.

12. The method of claim 11, wherein the application module is configured for including the additional metadata descriptors of the standard data component in the metadata descriptors of the component-based application model.

13. The method of claim 10, wherein the additional metadata descriptors of the standard data component include the ability to directly access the stored data entity through a data request to the device memory.

14. The method of claim 10, wherein the plurality of components are selected from the group comprising: a data component, a message component, a workflow component, and a presentation component.

15. The method of claim 14, wherein the additional metadata descriptors are configurable to be operatively coupled to the plurality of components through the metadata descriptors of the plurality of components.

16. The method of claim 9 further comprising a step of generating a runtime environment module for including the additional metadata descriptors of the standard data component.

17. A computer program product for developing a standard data component for coupling with a plurality of components of a component-based application to access a stored data entity of a non-component-based native application, the applications having the plurality of components including metadata descriptors expressed in a structured definition language for defining execution of the application in a runtime environment of a device, the computer program product comprising:

a computer readable-memory;

an application module stored on the computer readable memory and configured for storing a model of the component-based application including features of data and message metadata descriptors expressed in the structured definition language;

a native module stored on the computer readable memory and configured for storing properties of the data entity of the native application; and a standard module stored on the computer readable memory for generating the standard data component definition as additional metadata descriptors based on the features of the component-based application and the properties of the data entity of the native application, the additional metadata descriptors of the standard data component definition being expressed in the structured definition language;

wherein the application module is configured for including a reference to the standard data component definition in the metadata descriptors of the plurality of components, such that the standard data component definition is external to the metadata descriptors of the plurality of components and therefore the standard data component definition is configured for remote access through the reference;

wherein the additional metadata descriptors of the standard data component include the ability to invoke APIs of the non-component-based native application for accessing the stored data entity.

* * * * *